(12) United States Patent
Matthews

(10) Patent No.: US 9,132,796 B1
(45) Date of Patent: Sep. 15, 2015

(54) SPIDER WEB CLEARING DEVICE

(71) Applicant: Mark Matthews, Westfield, NC (US)

(72) Inventor: Mark Matthews, Westfield, NC (US)

( * ) Notice: Subject to any disclaimer, the term of this patent is extended or adjusted under 35 U.S.C. 154(b) by 0 days.

(21) Appl. No.: 14/025,956

(22) Filed: Sep. 13, 2013

Related U.S. Application Data

(63) Continuation-in-part of application No. 13/453,592, filed on Apr. 23, 2012, now abandoned.

(51) Int. Cl.
*B60R 19/54* (2006.01)
*B62J 23/00* (2006.01)
*H01Q 1/32* (2006.01)

(52) U.S. Cl.
CPC .............. *B60R 19/54* (2013.01); *B60R 19/545* (2013.01); *B62J 23/00* (2013.01); *H01Q 1/325* (2013.01)

(58) Field of Classification Search
CPC .... B50R 19/54; B50R 19/545; B62D 49/065; B62J 23/00; B25H 5/00; B60R 13/00; H01Q 1/32; H01Q 1/325; H01Q 1/3275; H01Q 1/3291
USPC ............ 280/762, 756, 288.4, 770; 248/125.8, 248/125.9, 127, 121, 539, 229.24, 228.5, 248/227.2; 293/123; 224/488, 401
See application file for complete search history.

(56) References Cited

U.S. PATENT DOCUMENTS

| | | | | |
|---|---|---|---|---|
| 1,107,832 A * | 8/1914 | Palis | ............................ | 280/770 |
| 1,205,800 A * | 11/1916 | Schwarzberg | .................. | 40/591 |
| 3,656,779 A * | 4/1972 | Ciungan | ........................ | 280/748 |
| 3,672,700 A * | 6/1972 | Marose | .......................... | 280/762 |
| 3,743,316 A * | 7/1973 | Stotesbery | ..................... | 280/762 |
| 3,770,293 A * | 11/1973 | Anderson | ...................... | 280/762 |
| 3,841,656 A * | 10/1974 | Kramb et al. | ................. | 280/762 |
| 4,209,788 A * | 6/1980 | Plantier | ......................... | 343/713 |
| 4,632,354 A * | 12/1986 | Asciutto | ....................... | 248/539 |
| 4,899,963 A * | 2/1990 | Murphy | .......................... | 248/65 |
| 5,039,056 A * | 8/1991 | Paxton | .......................... | 248/539 |
| 5,531,478 A * | 7/1996 | Houston et al. | ............... | 280/762 |
| 5,884,890 A * | 3/1999 | Fraley, Jr. | ..................... | 248/539 |
| 6,945,735 B1 * | 9/2005 | Doverspike | ................ | 405/184.4 |
| 7,266,431 B2 * | 9/2007 | Jackson | ............................ | 701/1 |
| 7,448,590 B1 * | 11/2008 | Holton | .......................... | 248/534 |
| 7,513,467 B1 * | 4/2009 | Hurley | ........................ | 248/125.9 |
| 8,176,832 B1 * | 5/2012 | Rose et al. | .................... | 89/36.08 |
| 2006/0261112 A1 * | 11/2006 | Gates et al. | .................... | 224/558 |
| 2007/0252071 A1 * | 11/2007 | Huang | .......................... | 248/539 |
| 2007/0262219 A1 * | 11/2007 | Hutter | ......................... | 248/229.1 |
| 2008/0029018 A1 * | 2/2008 | Rehkopf | ....................... | 116/173 |
| 2008/0251651 A1 * | 10/2008 | Jackson et al. | .................. | 248/62 |
| 2011/0147554 A1 * | 6/2011 | Liao et al. | ................ | 248/226.11 |
| 2011/0240699 A1 * | 10/2011 | Stacy | ............................ | 224/488 |
| 2012/0138760 A1 * | 6/2012 | Gephart et al. | .......... | 248/226.11 |

* cited by examiner

*Primary Examiner* — J. Allen Shriver, II
*Assistant Examiner* — Steve Clemmons
(74) *Attorney, Agent, or Firm* — Robert W. Pitts

(57) ABSTRACT

A spider web clearing device is mountable on the front of an off road vehicle, such as an all terrain vehicle. The device includes an upright flexible rod that when positioned at the front will engage and sever or snap any spider webs and will prevent the spider webs from engaging the driver. The rod will deflect equally in any direction when it strikes and obstruction. The rod is attachable to a mounting bracket which includes a top and a bottom mount. Curved recesses in each mount allow the bracket to be secured to a tubular member on the vehicle and the bottom mount can serve as a spacer when the top mount is attached directly to a horizontal surface on the vehicle.

8 Claims, 10 Drawing Sheets

SPIDER WEB CLEARING DEVICE

CROSS REFERENCE TO PRIOR CO-PENDING APPLICATIONS

This application claims priority benefit of Provisional Application Ser. No. 61/481,880, filed on May 3, 2011 and is a continuation-in-part of U.S. patent application Ser. No. 13/453,592 filed Apr. 23, 2012.

BACKGROUND OF THE INVENTION

1. Field of the Invention

The present invention is a spider web clearing device attached to all-terrain and operator-driven lawn-maintenance vehicles, including but not limited to, off-road 4-wheel vehicles (also known as 'quads'), tracker-type lawn mowers, zero-turn lawn tractors, off-road bicycles and off-road motorcycles, (described together in this document as "ATV" and/or "ATV's")

2. Description of Related Prior Art

The present invention, in some general respects, may relate to U.S. Pat. No. 5,531,478. U.S. Pat. No. 5,531,478 was intended to attach only to an off-road 4-wheel recreational vehicle and was designed for the purpose of attempting to clear away spider webs. Likewise, other devices that may be attached to ATV's other than web clearing attachments may inadvertently and potentially perform the task of clearing away spider webs. U.S. Pat. No. 5,531,478, flags and antennas, when mounted on the front of an ATV, may incidentally serve the purpose of clearing away spider webs. U.S. Pat. No. 5,531,478, flags and antennas are not designed properly for the task of clearing spider webs from a trail or road and are not cost efficient for the task.

ATV operators very frequently encounter spider webs positioned by spiders across the roads and trails and among trees and other objects on and around lawns on which ATV's travel. These spider webs are extremely difficult, if not impossible, for the ATV operator to sec or to avoid before the ATV operator actually comes into contact with the spider web itself. This unforeseeable contact causes spiders and spider webs to come into direct contact with the ATV operator. Often, this unforeseeable contact occurs across the face and eyes of the ATV operator. Contact with spiders and spider webs to the face and eyes is a major safety hazard for the ATV operator, causing the ATV operator to remove one hand from the steering column or handle bars of the ATV in attempts to remove the spiders and spider webs for the ATV operators face and eyes. Spider webs across trails and between objects on lawns and the like cause aggravation for the ATV operator and substantially reduce the work and utility and/or recreational pleasure of operating an ATV. The applied-for spider web clearing device eliminates the safety hazards and aggravations caused by spiders and spider webs in a simple and cost-efficient manner. U.S. Pat. No. 5,531,478, flags and antennas are not designed for a safe, effective, and cost-efficient solution for clearing spider webs from coming into contact with the ATV operator. Neither the manufacturing processes nor the materials used in the above-presently-existing and above-identified items are viable or affordable solutions for clearing spider webs from the lawn, path or road directly in the path of the ATV operator.

For ATV operators, spider webs hanging between obstacles and trees in the lawn or across trails and roads present both a risk to personal safety and are an aggravation for the operator. At the present time, in view of the design deficiencies of U.S. Pat. No. 5,531,478, ATV operators only have for their potential use a device that impairs the operator's vision, that is inefficiently mounted, that is unnecessarily bulky and is heavier than necessary for the task of clearing away spider webs from the path of the ATV operator. Inadequacies and inferiorities in the realm of overall product design and in the realm of practicality of actual production detract from the device identified as U.S. Pat. No. 5,531,478. Radio antennas and ATV flags inadequately and unsatisfactory protect the ATV operator from the safety risks and aggravation of spider webs in the path of the ATV operator. When an antenna or flag is mounted in front of the ATV operator, there exists a threat and danger of the antenna or flag whipping back in the direction of the operator, creating a risk to safety. Antennas, made for radio reception, and ATV flags, made for allowing other ATV operators to better see another ATV, are unnecessarily long and are unsuited to be mounted on the front of an ATV.

U.S. Pat. No. 5,531,478 has a fork-like design, much like a "Y". U.S. Pat. No. 5,531,478 also has a double fork-like design, much like a double "Y". These fork-like designs are neither necessary for effective clearing nor practical in design for their intended purpose. Extensive field testing has established that spider webs are attached from points on both sides of trails and roads and are necessarily under high tension. When broken by the device identified as U.S. Pat. No. 5,531,478, a spider web will not recoil and collapse away from the ATV and its operator, as intended. Instead, U.S. Pat. No. 5,531,478 is designed in a fashion that draws the spider web toward the ATV operator. Therefore, a fork-like or double-mounted fork-like clearing device, as in U.S. Pat. No. 5,531,478 defeats the natural tendency of the disturbed spider web to spring out and away from the ATV operator's path. In fact, extensive field testing establishes that the "Y" design of U.S. Pat. No. 5,531,478 actually causes the spider web with which it makes contact to fold backward into the ace and body of the ATV operator. These forked or double-forked clearing devices also accumulate spider webs on the devices themselves, creating for the ATV operator a sight restriction and a diversion of attention from driving the ATV. This is a design error that fails at the purpose intended, namely the efficient clearing of spider webs away from the ATV operator and away from the trail or road. The design is also impractical, because the fork-like designs cause totally unnecessary and added expense to the device's manufacture. U.S. Pat. No. 5,531,478 was not design at all for lawn maintenance applications.

Notably, too, U.S. Pat. No. 5,531,478 mounting hardware is not constructed for multiple mounting applications. The size and weight of the mounting hardware limits the ways it can be attached to the ATV. This excessive weight and size affect mounting applications for smaller ATV's such as so-called mountain bicycles and off-road motorcycles. Added expense will be incurred by the ATV operator from the added requirement of having to mount extra or different hardware materials than the hardware identified in U.S. Pat. No. 5,531,478. Tested, alternative mounting methods, such as clip-on hardware and/or stick-on hardware are not strong enough or durable enough for the intended task while at the same time encountering overhanging trail and lawn obstacles.

The forked clearing devices described in U.S. Pat. No. 5,531,478 present formidable difficulties in actual production and manufacture. Specifically, standing alone, the materials and tooling that would be required to actually produce the main, upright component of the fork-like and double fork-like devices cause U.S. Pat. No. 5,531,478 to be prohibitively expensive to make. Also, in view of the fact that any spider web clearing device on an ATV must be flexible, due to low-lying branches and other low-lying obstacles, the materials and tooling to manufacture U.S. Pat. No. 5,531,478 become all the more complex and expensive. By its own design, then, the forked devices of U.S. Pat. No. 5,531,478 must necessarily utilize specialized manufacturing processes. This specialized manufacturing necessarily will incur expenses well beyond those simple and straightforward production processes used to manufacture the spider web clearing device addressed in this application for patent.

As addressed in relation to U.S. Pat. No. 5,531,478, whipping action must be reduced to a minimum to protect the ATV operator from having the device strike an overhanging object and bend itself backward into the face and body of the ATV operator. U.S. Pat. No. 5,531,478 attempts to reduce whipping action by incorporating a stop member onto its mounting assembly. U.S. Pat. No. 5,531,478, then includes an unnecessary component adding further expense, weight and bulk. The overall area of trail or lawn space attempted to be cleared of spider webs by the bulky "Y" shape of U.S. Pat. No. 5,531,478 creates greater and more frequent movement when impact is made with obstacles or when traveling on uneven terrain. The "Y" shape design in U.S. Pat. No. 5,531,478 takes up a broader area of space in front of the ATV operator, thus hindering the ATV operator's vision. Extensive field testing revealed that a single upright clearing device, as in the spider web clearing device applied for herein, is essential for minimal resistance to tree limbs, vines, branches or any obstructions that may be encountered on a trail or road or lawn. The applied-for spider web clearing device's upright component is designed at an optimal height to clear spider webs while, at the same time, protecting the ATV operator from excessive whipping action. This designed height disallows any whipping action that can come within reach of the ATV operator. The material from which the upright component is made is sufficiently flexible to bend when in contact with overhanging obstacles, but rigid enough to minimize whipping action. At the same time, the uptight component is sufficiently small in diameter to maximize visibility for the ATV operator.

Flags and antennas are designed for specific purposes and needs not at all associated with the clearing of spider webs from the path of an ATV operator. Flags and antennas are rarely, if ever, used on lawn maintenance equipment. Flags and antennas can, by happenstance, act as a spider web clearing device when they are installed in the front of an ATV. Flags and antennas are, however, designed for their own specific purposes, in practically all cases for mounting on the rear of an ATV so as not to interfere with the operator due to their length and their excessive flexibility. If mounted on the front of an ATV, the overall length of the antennas and flags, and their resulting whipping action, can easily reach the ATV operator. This condition disallows antennas and flags from being suitable for the purpose of clearing spider webs at any time and especially in heavy obstacle and terrain conditions. Research has uncovered no instance where an antenna or flag was advertised, or even mentioned in advertisements, to protect the ATV operator form spider webs or any other obstacle. The applied-for spider web clearing device is specifically designed to be mounted on the front and in the center of an ATV for the singular purpose of severing a spider web by taking advantage of the spider web's natural tension. This severing by the applied-for spider web clearing device causes the spider web to recoil away from the ATV operator and ATV itself.

SUMMARY OF THE INVENTION

This spider web clearing device claims priority benefit of Provisional Application No. 61/481,880 filed on May 3, 2011. The following is a summary description of the invention described herein as a spider web clearing device for ATV operators. This spider web clearing device is designed to be attached to an ATV on its front side, in the center, and directly in front of the ATV operator for the singular intended purpose of clearing spider webs from trails, lawns, paths and/or roads. The spider web clearing device is developed as an inexpensive and practical device for clearing spider webs from trails, lawns and roads when operating an ATV with an exposed operator. During the majority of the months of the year, and in some areas throughout the year, spider webs are a real and identifiable safety hazard and nuisance to ATV operators due to spider webs and spiders themselves, attaching to the ATV operator's face and eyes as the operator negotiates trails, lawns and roads. The spider web clearing device was invented for the singular purpose of eliminating the safety hazard and aggravation of operating an ATV on trails, lawns and paths un-cleared of existing spiders and spider webs. The spider web clearing device is developed to alleviate the ongoing safety hazard of and ATV operator attempting to drive and ATV with only one of two hands on the steering column while attempting to clear web debris and/or spiders off of the ATV operator's face and eyes. Operational testing establishes that spider webs are naturally under tension and spring away and to the sides of the ATV operator's path when broken or split with the spider web clearing device. This same operational testing reveals that strategically placing a single, upright clearing rod in the front and in the center of the ATV and in front of the ATV operator completely cleared all spider webs from the trail/path of the ATV operator and did so effectively and efficiently. Further operational testing showed that the spider web clearing device created a much safer, more efficient and enjoyable experience for the ATV operator. Therefore, and respectfully, this is a product that can readily be made available to all ATV operators at a reasonable price because of cost efficient design and manufacturing. After extensive and exhaustive research, it seems most apparent that such a device is nowhere available for purchase. The spider web clearing device is made of small diameter solid nylon rod that is threaded into an adaptable mount suitable for both small and large ATV's. The height and size of the upright component is suitable for efficient spider web clearing while allowing the operator to maintain both hands on the steering column and/or handlebars. The spider web clearing device allows for safe and efficient maneuverability of the ATV with very minimal visual obstruction. The spider web clearing device clears webs with minimal-whipping action while maintaining the flexibility needed to maneuver in highly obstructed conditions. The top end of the upright is fitted with a rubber tip to prevent abrasive edges and for cosmetic reasons. The spider web clearing device's mounting hardware is designed for easy and stable fastening to ATV round tube racks, square tube racks, composite plastic tubing, composite rubber tubing and any platform, flat or otherwise, located at the front and center of an ATV. The spider web clearing device is designed to be mounted either vertically or slightly leaned into a forward or backward angle from the vertical position.

BRIEF DESCRIPTION OF THE DRAWINGS

The present invention is further described in detailed description which follows in reference to the figures.

DETAILED DESCRIPTION OF THE PREFERRED EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more", even though the phrase "one or more" is also used herein. Furthermore, when it is said herein that something is "based on" something else, it may be based on one or more other things as well. In other words, unless expressly indicated otherwise, as used herein "base on" means "based at least in part on" or "based at least partially on."

While the foregoing disclosure discusses illustrative embodiments, including, but not limited to, specific diameters, lengths, thread counts, bracket sizes, and the identification of component materials, it should be noted that various changes and modifications could be made herein without departing from the scope of the described aspects and/or embodiments as defined by the appended claims. Furthermore, although elements of the singular, the plural is contemplated unless limitation to the singular is explicitly stated. Additionally, all or portion of any embodiment may be utilized with all or a portion of any other embodiment, unless stated otherwise.

It is noted that the spider web clearing device described herein is described in an in-use or deployed environment as opposed to a stored environment. Thus, the description below should not limit an understanding of the spider web clearing device in a packaged, stored environment. For example, the mounting hardware is packaged as one unit, but it is understood that when the mount is mounted on a flat platform the bottom half of the mounting bracket is not needed.

Figure 1:
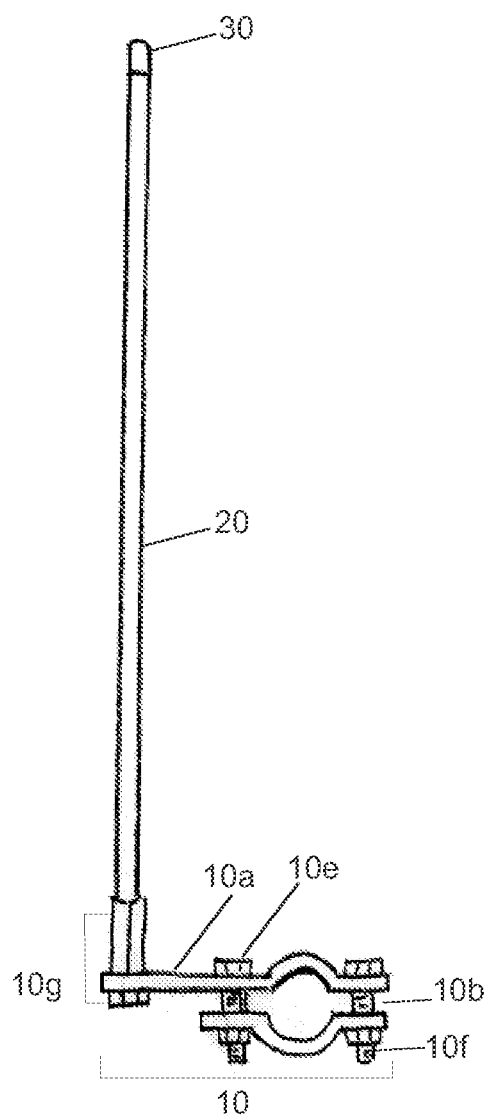
FIG. 1 is a perspective view of a side of the spider web clearing device according to the present invention (for tubular applications)

With reference to FIG. 1, the embodiment of the spider web clearing device as viewed from a side view illustrates the three basic components, base mount 10, further illustrated to clarify the two halves 10a-10b, nylon rod. 20, rubber tip guard, 30 and two mounting bolts and nuts for round and square tubing attachment purposes, sec 10e-10f. The upright nylon rod threaded coupling, fastening bolt, and 2 plastic washers 10g are components of the complete unit 10. All three basic components 10, 20, 30 can be purchased as individual units that can be used for multiple applications and products with minimal modification. Incorporating already manufactured ready-to-implement components, enables the ability to produce a much more cost efficient product that will deliver the desired results.

Figure 2:
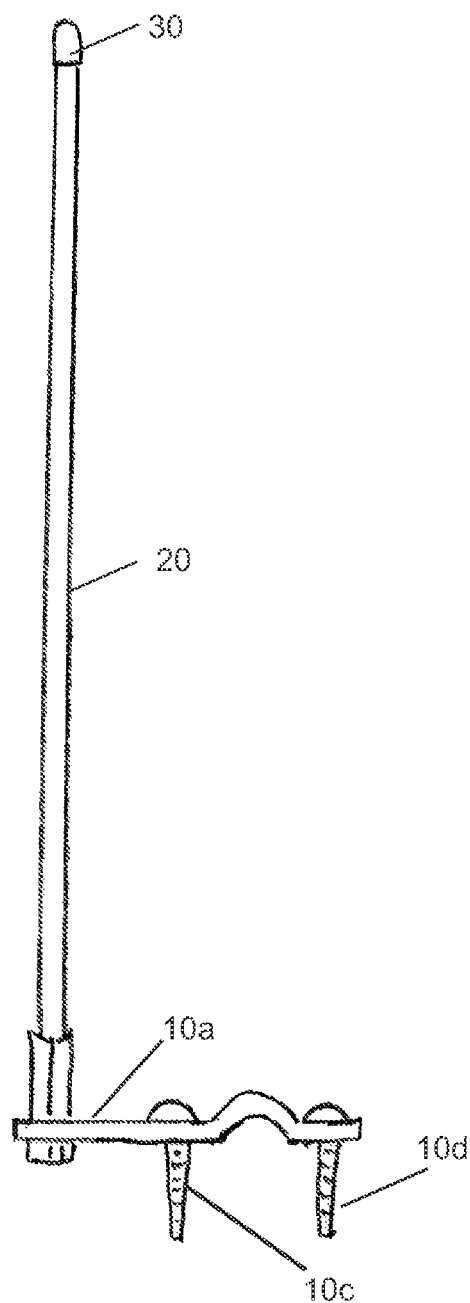
FIG. 2 is a perspective view of a side of the spider web clearing device according to the present invention (for flat surface applications)

With reference to FIG. 2, illustrating the embodiment from a side view for flat surface applications, the embodiment illustrates the three basic components, FIG. 1 base mount 10, nylon rod, 20, rubber tip guard, 30 with the bottom mount half of FIG. 1, 10b removed. The two additional mounting screws, 10c-10d are shown installed for flat platform attachment purposes.

Figure 3:
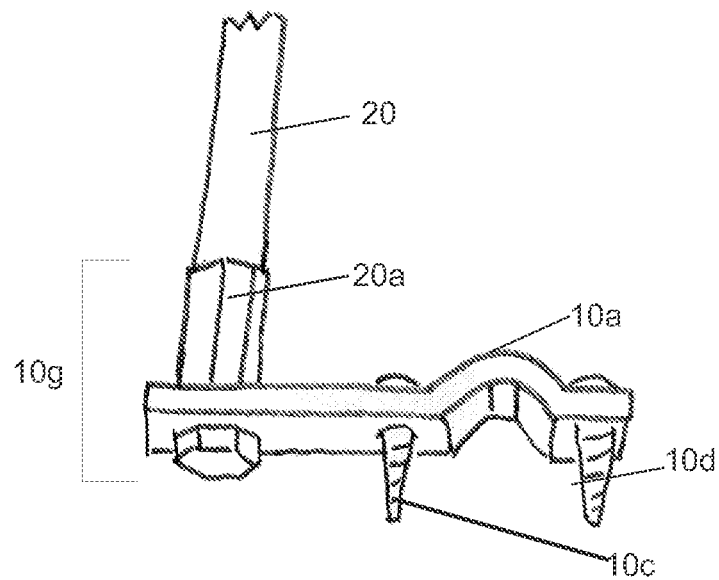
FIG. 3 is a bottom side angle view of the left side mount of the spider web clearing device of FIG. 1 (for flat surface applications)

As illustrated FIG. 3 shows the top half 10a of the mount 10 at a bottom angle side view for flat surface mounting showing the additional mounting screws, 10c-10d installed and the bottom half 10b removed. The coupling and upright mounting hardware 10g is included in the complete mount, 10. The complete mount, 10, refers to both flat and tubular mounting configurations as depicted in FIGS. 1-6. The upright nylon rod, 20 only illustrates the bottom portion of the complete nylon rod, 20 illustrated to show that the lower end of the nylon rod, 20a is threaded from the base and screwed into the upright coupling for fastening to the mount coupling, 10g as illustrated as a part of the complete mounting unit 10 as shown in FIG. 1. The rod is mounted on the distal end of the upper mount 10a, which forms a cantilever between the mounting screws 10f and the rod 20 and its mount coupling 10g. This cantilever configuration allows a certain amount of flex, so that there will not be undue stress placed on the coupling 10g, and the rod 20, but the cantilever portion of the upper mount is sufficiently rigid to provide damping as the rod 20 whips about as will be discussed in more detail.

Figure 4:
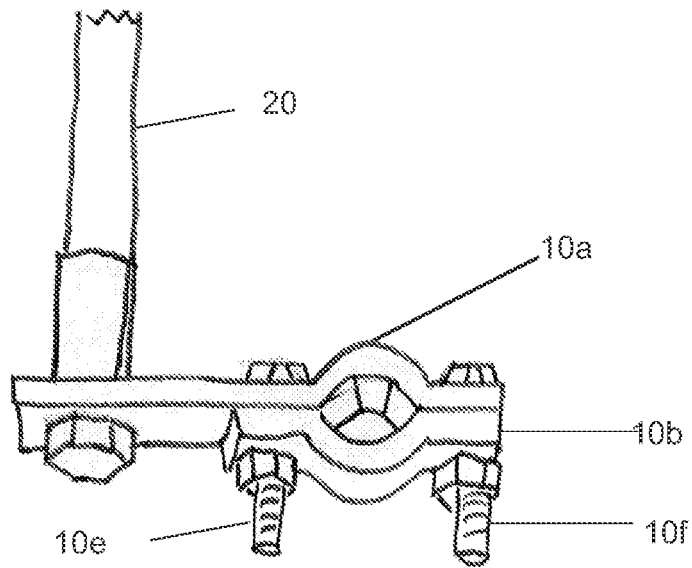
FIG. 4 is a bottom side angle view of the left side mount of the spider web clearing device of FIG. 1 (for tubular applications)

As illustrated FIG. 4 shows the mount 10 as depicted in FIG. 1 at a bottom angle side view further depicting the components for square, round and multiple shaped tubular mounting. The mount half 10b, is illustrated to be fastened to the top half of the mount 10a by included bolts. Mounting components 10e-10f are also shown in FIG. 4. The upright nylon rod, 20, only illustrates the bottom portion of the complete nylon rod, 20 to show that the lower end of the nylon rod, 20a, is threaded from the base and screwed into the upright coupling for fastening to the mount coupling or ferrule, 10g, as illustrated as a part of the complete mounting unit, 10 as generally seen in FIG. 1.

Figure 5:
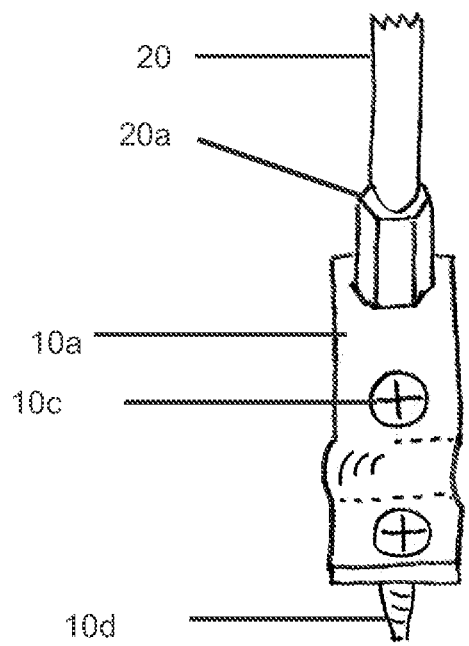
FIG. 5 is an elevation view of the back side mount of the spider web clearing device as will be used for flat thin and thick surfaces with the use of screws of FIG. 1.

As illustrated, FIG. 5 is a back elevational view of the mount, 10a, for flat surface applications with additional screws, 10c-10d installed. The top view of the fastening hardware screws, 10c-10d, can be seen to be Philip round head screws. although not to be limited to Philips round head screws. Many options and variables are available for fastening hardware. Fastening hardware screws and bolts; cannot be predicted due to the many thicknesses and densities of the many mounting surfaces of ATV's. The bottom portion of the nylon rod, 20, can be seen from this angle with the threading, 20a, inserted into the threaded coupling, FIG. 1, 10g.

Figure 6:
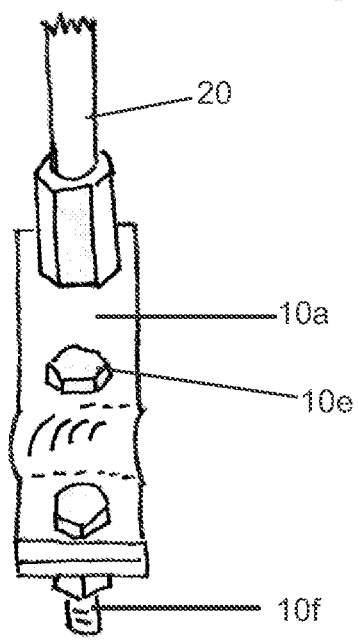
FIG. 6 is an elevation view of the back side mount of the spider web clearing device as will be used for round, square and all tubular mounting applications with the use of bolts of FIG. 1.

As illustrated, FIG. 6 is a back elevational view of the mount, 10a-10b for round and square tube mounting with the use of provided bolts and nuts, 10e-10f, installed. The top view of the fastening hardware bolts, 10e-10f, can be seen to be hex head bolts, although not to be limited to hex head bolts. Many options and variables are available for fastening hardware. Fastening hardware bolts cannot be predicted due to the many different tubing sizes and configurations of the many tubular mounting surfaces for ATV's. For example, a tubing configuration may dictate that a screw head bolt may be needed due to limited access to the bolt heads, 10e-10f. This alternative configuration also applies to fastening hardware screws, 10c-10d, may require different type heads for different installation requirements. The bottom portion of the nylon rod, 20, can be seen from this angle with the threading, 20a, inserted into the threaded coupling, 10g, with no threading exposed.

Figure 7:
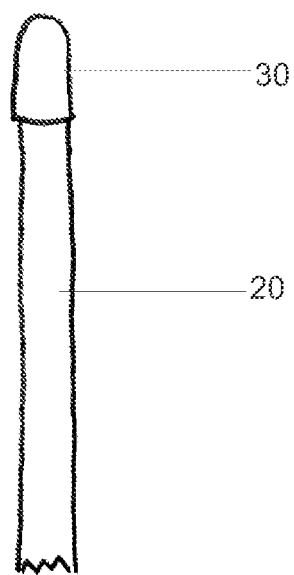
FIG. 7 is a side view of the rubber tip as will be used for abrasive edge protection and cosmetic appeal of FIG. 1.

With reference to FIG. 7, depicts the rubber cap, 30, installed on the top end of the nylon rod, 20, with only the top portion of the nylon rod, 20, illustrated. The rubber cap, 30, inside diameter is ⅜ of an inch as is the nylon rod, 20, which has an outside diameter is ⅜ of an inch. This enables the rubber cap, 30, to be placed on the nylon rod, 20, with minimal effort while providing a secure fit The nylon rod, 20, is a material referred to by industry standard as being "⅜ inch nylon MDS extruded rod, gray". The nylon rod, 20, is cut to a 32 inch length and threaded at a ⅜ inch, 24 thread count. The threading is machined into the nylon rod 9/16 of an inch from the base as to insert into the mounting coupling, 10g, as part of the complete mounting unit. 10. This method of installation enables easy removal of the upright nylon rod, 20 when not desired. The nylon rod, 20, materials have proven to be durable, flexible and cost efficient for the intended purpose of clearing spider webs in unpredictable climates and terrain. Nylon rod, 20, temperature testing proved that sufficient flexibility and rigidness are maintained well below freezing temperatures and in high heat temperature conditions. Change in temperatures will not affect proper operation in normal, seasonal insect/spider thriving conditions.

Figure 8:
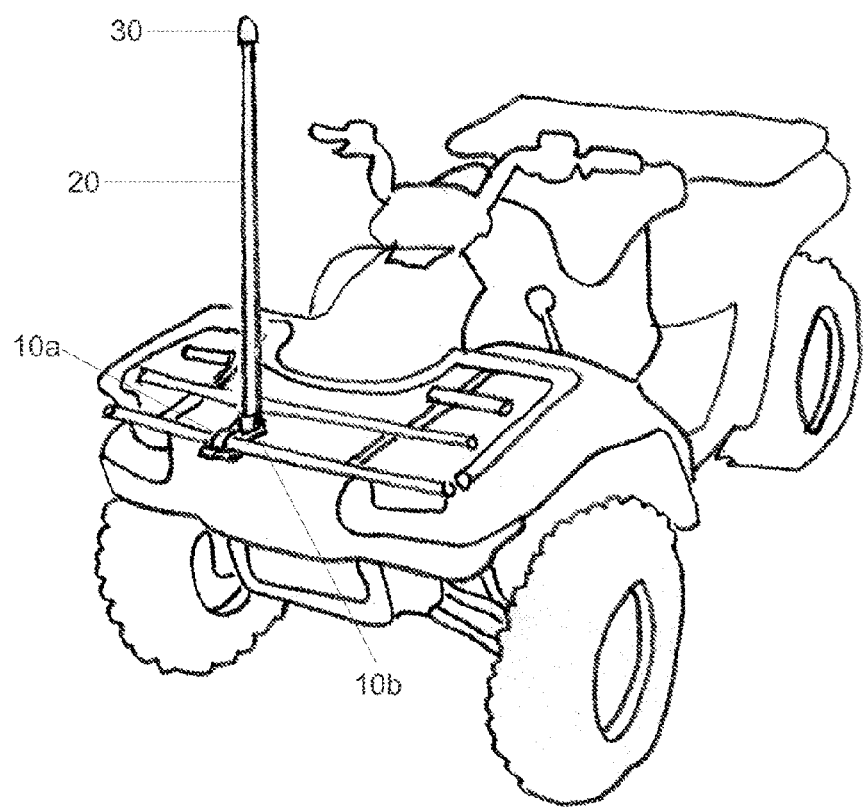
FIG. 8 is an illustrative view of the FIG. 1 device as affixed to a tubular-style surface on a recreational type ATV.

With reference to FIG. 8, the embodiment of the spider web clearing device as viewed from a front, right angle view illustrates the three basic components as mounted on an ATV, base mount, 10, further illustrated to clarify the two halves 10a-10b, nylon rod, 20, rubber tip guard, 30, and two mounting bolts and nuts for round, square and all tubing application purposes. The upright spider web clearing device is shown in FIG. 8 mounted on the ATV's front side, in the center, and as directly in front of the ATV operator as possible for the singular intended purpose of clearing spider webs from trails, lawns, paths and/or roads.

Figure 9:
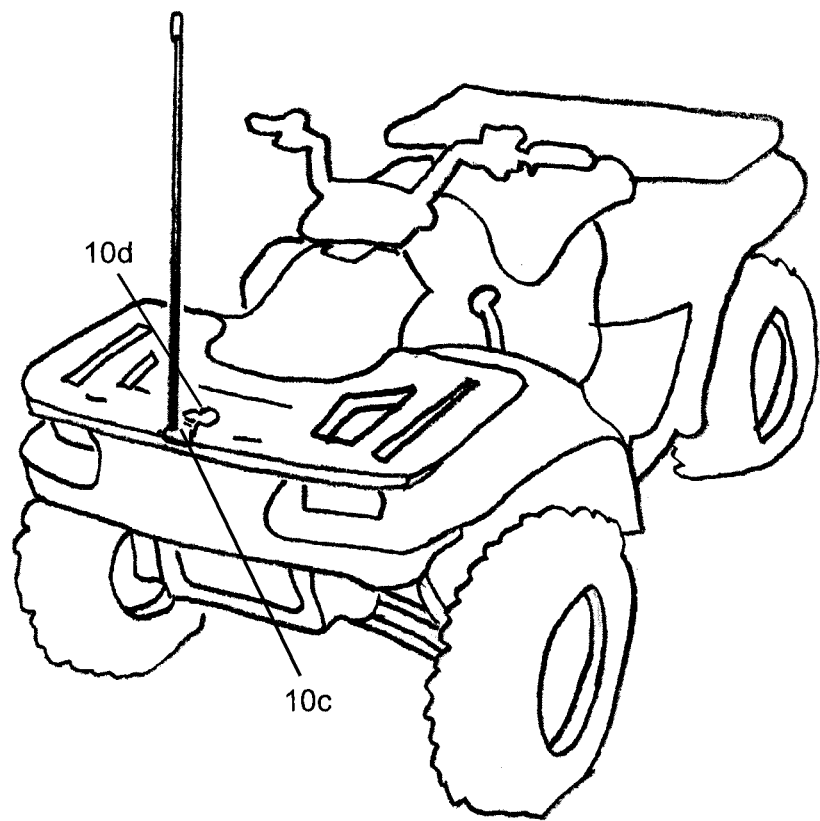
FIG. 9 is an illustrative view of the FIG. 1 device as affixed to a flat style surface on a recreational type ATV.

With reference to FIG. 9, illustrating the complete unit from a front, right angle view, the embodiment illustrates the three basic components, FIG. 1 base mount, 10, nylon rod 20, rubber tip guard, 30, with the bottom half of the bracket mount, 10b, removed. The two additional mounting screws, 10c-10d, are shown installed for flat platform application purposes.

Figure 10:
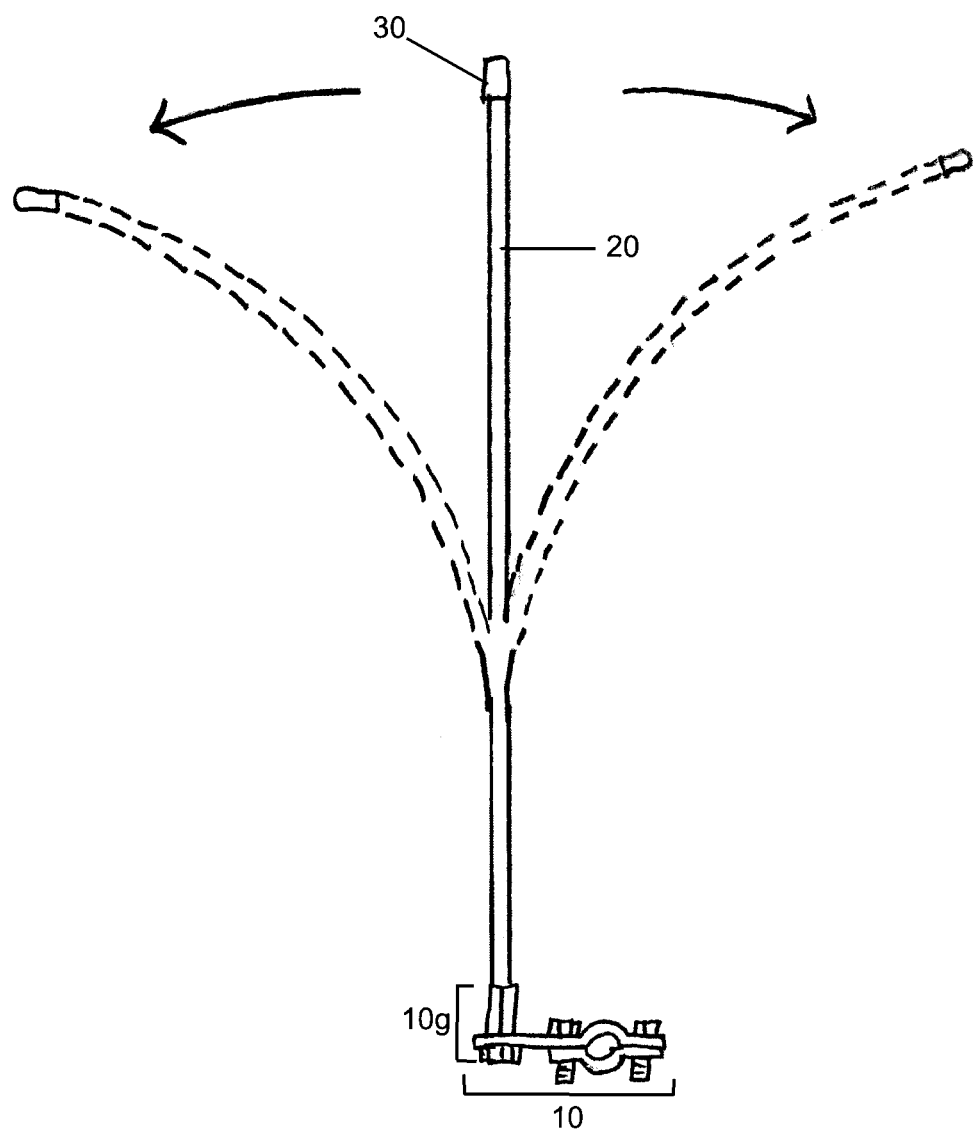
FIG. 10 is an illustrative view from the side of the flexibility of the web clearing device.

With reference to FIG. 10, illustrating a front right angle view of the embodiment as referenced in FIG. 1 and also referenced in FIG. (not illustrated in this FIG. 10), and depicting the forward and backward deflection to illustrate the device's flexing capability. The movement depicted in FIG. 10 is illustrative only to the extent of showing forward and backward flexibility, but the embodiment of the device is capable of such bending in any direction with a 360 degree direction from its base.

Figure 11:
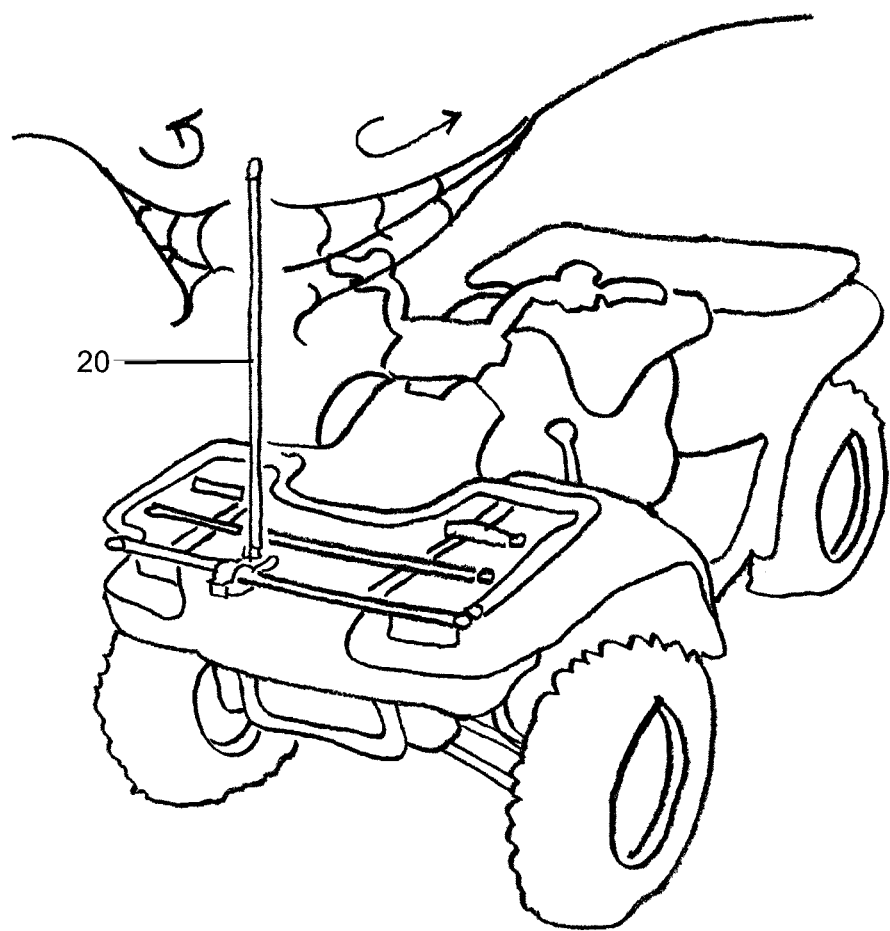
FIG. 11 is an illustrative view of the manner in which the web clearing device impacts and breaks away a spider web by utilizing the natural tension of the spider's web.

FIG. 11 is an illustrative view of the manner in which the vertically-mounted nylon rod, 20, of the web clearing device impacts and breaks away a spider web by utilizing the natural tension of the spider's web.

Figure 12:
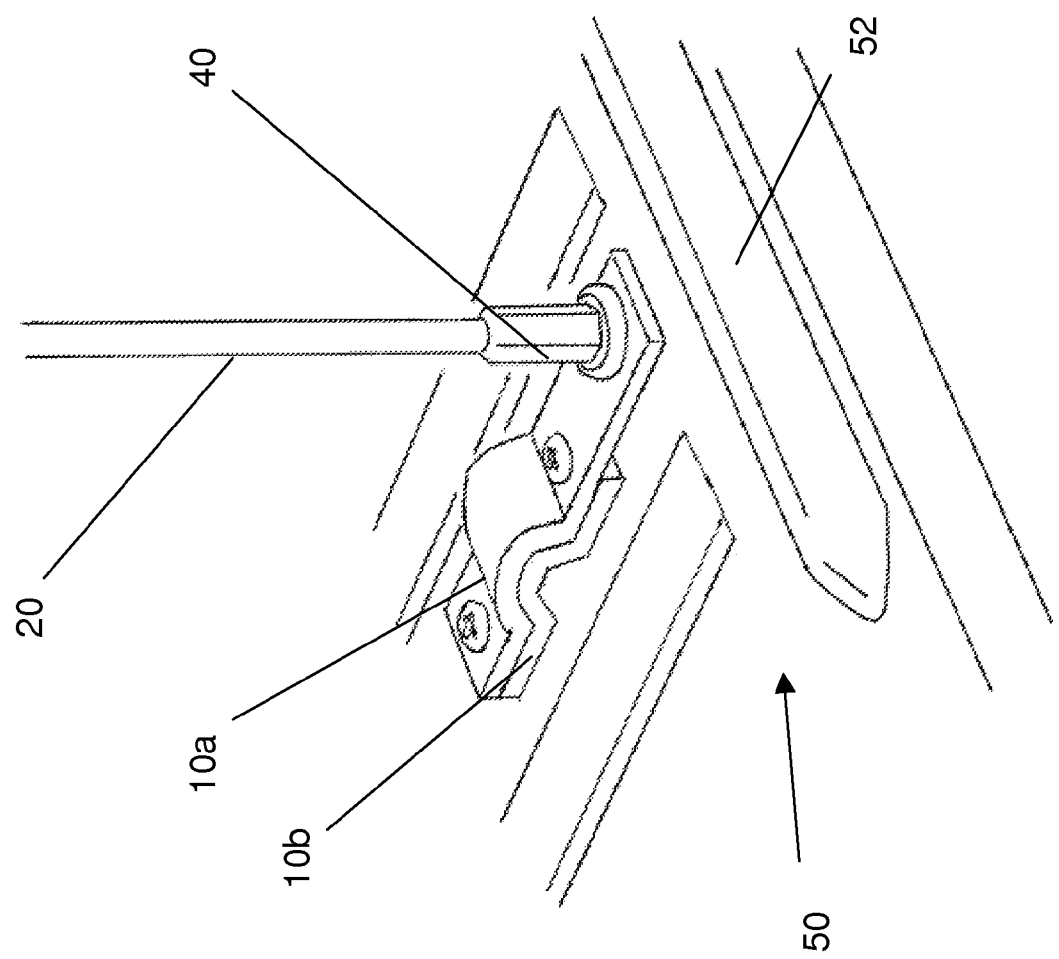
FIG. 12 is a view of the rod mounted to a flat surface on an ATV using the same mounting bracket, assembled in such a manner that clearance can be provided between the flat surface and the lower end of the rod.

Although the mounting bracket hardware 10 can be used to attach the rod 20 to certain flat surfaces as shown in FIGS. 2 and 3, there are certain vehicles that will not permit the rod 10 to be attached to a front upper surface on the vehicle in this manner. In those configurations, the rod 20 can be located beyond the front of the vehicle and there will be sufficient clearance for the bolt on the lower surface of the mounting hardware. FIG. 12 shows another manner in which the rod can be attached to other vehicles having protrusions, such as ribs 52 extending upwardly from a front upper surface. On such a vehicle, there is not enough clearance to permit the rod 20 to be positioned in that way. The mounting hardware 10 can, however, be assembled in the manner shown in FIG. 12 so that there will be clearance for the lower bolt. As shown in FIG. 12, the lower mount half 10b can be nested in the upper mount half 10a so that the lower mount half 10b will act as a spacer. The rod 20 will thus be positioned above the upper surface 50 on the vehicle so that there will be clearance for the bolt. The mounting hardware 10 can thus be assembled in three different configurations. First the mounting hardware 10 can attach the rod 20 to a tubular member or rail as shown in FIGS. 8 and 11. Second, the rod 20 can be attached directly to a vehicle upper surface as shown in FIGS. 2, 3 and 9, where only the upper mount is employed. In FIG. 12, the lower mount 10b acts as a spacer when nested on upper mount 10a, The curved sections of mounts 10a and 10b will nest as shown in FIG. 12.

While certain exemplary embodiments have been described and shown in the accompanying drawings, it is to be understood that such embodiments are merely illustrative of and not restrictive on the broad invention, and that this invention not be limited to the specific constructions and arrangements shown and describe, since various other changes, combinations, omissions, modifications and substitutions, in addition to those set forth in the above paragraphs are possible. Those skilled in the art will appreciate that various adaptations and modifications of the above-described embodiments can be configured without departing from the scope and spirit of the invention. Therefore, it is to be understood that, within the scope of the appended claims, the invention may be properly and adequately constructed and practiced other than as specifically described herein.

I claim:

1. A spider web clearing device mountable on an off-road vehicle comprising
    an upright flexible rod;
    a mounting bracket comprising a top mount and a bottom mount, the rod being attachable to the mount, wherein the mount is positionable to attach the rod in any of three different configurations, in a first configuration the top and bottom mounts surround a portion of a tubular member on the off-road vehicle, in a second position the top mount being attachable to a surface of the off-road, and in a third configuration, the top mount being attachable to a surface of the off-road vehicle with the bottom mount positioned therebetween to form a spacer.

2. The spider web clearing device of claim 1 wherein both the top and bottom mount has a curved section, the curved section on the bottom mount being nestable in the curved section on the top mount.

3. The spider web clearing device of claim 2 wherein a ferrule is attached to the top mount by a bolt extending below the top mount, the bottom mount comprising a spacer when in the third configuration to provide clearance for the bolt.

4. The spider web clearing device of claim 3 wherein the ferrule is mountable on a cantilever section of the top mount.

5. The spider web clearing device of claim 4 wherein the rod is screwed into the ferrule.

6. The spider web clearing device of claim 5 wherein the rod is free to deflect equally in any direction upon striking an obstruction.

7. The spider web clearing device of claim 1 wherein the rod comprises means for severing a spider web so that the spider web does not contact and operator of the off-road vehicle.

8. The spider web clearing device of claim 7 wherein the rod in mounted on the front of an all terrain vehicle in the center.

\* \* \* \* \*